United States Patent Office 3,118,820
Patented Jan. 21, 1964

3,118,820
PROCESS FOR THE PRODUCTION OF HYPOXANTHINE DERIVATIVES
Kazuo Uchida, Akira Kuminaka, Hiroshi Yoshino, and Masajiro Kibi, Choshi-shi, Chibaken, Japan, assignors to Yamasa Shoyu Kabushiki Kaisha (also trading as Yamasa Shoyu Co., Ltd.), Choshi-shi, Japan, a joint-stock company of Japan
No Drawing. Filed Nov. 21, 1960, Ser. No. 70,416
Claims priority, application Japan Nov. 24, 1959
13 Claims. (Cl. 195—28)

This invention relates to a process for producing hypoxanthine derivatives (hypoxanthine, inosine, and inosine 5'-monophosphate) by cultivating auxotrophs derived from various strains of microorganisms such as Bacillus, Escherichia, Streptomyces, Saccharomyces, Torula, Aspergillus and Penicillium, which require adenine for growth. The object of this invention is to accumulate hypoxanthine derivatives in culture liquor or cells resulting from the cultivation of such auxotrophs, and to obtain these compounds economically and in good yield.

Among hypoxanthine derivatives, inosine 5'-monophosphate is especially important, since it has been recognized that it has a very flavorous taste. Up to present inosine 5'-monophosphate has been prepared generally only by organic synthesis, extraction from tissues of various organisms, or degradation of ribonucleic acid to 5'-nucleotides, followed by deamination of the adenosine 5'-monophosphate formed. The process of this invention is much more economical than those of the above mentioned three procedures, since in this invention inosine 5'-monophosphate may be produced from cheap raw materials, and inosine or hypoxanthine formed simultaneously secondarily may be converted to inosine 5'-monophosphate.

Generally speaking, microorganisms isolated from the soil do not produce hypoxanthine derivatives during cultivation. However, according to the present invention certain auxotrophs which need adenine only for their growth and which are derived from various strains of wild microorganisms biochemically synthesize large amounts of hypoxanthine derivatives during cultivation in a medium containing greater amounts of assimilable nutrient sources then required for propagation, and accumulate them in at least one cultured material selected from the group consisting of cells and culture liquor. The term "wild" in this connection defines a growth of microorganism, where no attempt is made to control the growth thereof.

According to the present invention, auxotrophs, which require only adenine but do not require hypoxanthine in place of adenine for growth thereof in the minimum medium, are able to produce and accumulate large amounts of hypoxanthine derivatives. On the other hand, the auxotrophs, which do require adenine and also are able to grow in the minimum medium plus hypoxanthine in place of adenine, are not known to be capable of producing hypoxanthine derivatives. Furthermore, it is recognized that many auxotrophs of Bacillus which do require adenine for growth are able to produce and accumulate large amounts of hypoxanthine derivatives. Generally speaking, however, there is no special relation between the abilities of auxotrophs to produce or accumulate hypoxanthine derivatives and the classificational positions of parent strains of said auxotrophs. Therefore, this invention is applicable to the auxotrophs of various microorganisms such as Bacillus, Escherichia, Streptomyces, Torula, Saccharomyces, Aspergillus, and Penicillium which require only adenine and not hypoxanthine for growth in the minimum medium, independently of the classificational positions of parents strains of auxotrophs employed. The auxotrophs requiring adenine may be obtained by treatment of wild strains of microorganisms with ultraviolet light, X-ray, γ-ray or nitrogen mustard.

According to the present invention the auxotrophs, which require only adenine for their growth in the minimum medium, and cultivated with ultraviolet absorbing substances increase rapidly in a stationary phase. In this phase, propagation of cells is minimum and consumption of carbon sources still continues. The ultraviolet absorbing substances accumulated in the culture liquid are found to be derivatives of hypoxanthine; inosine-5'-monophosphate, inosine and hypoxanthine. These compounds are also accumulated in the cells and are easily extracted with hot water, cold perchloric acid or cold trichloroacetic acid. Moreover, hypoxanthine derivatives accumulated in the culture liquor in the cells maybe easily separated, and purified by conventional procedures such as ion exchange resin chromatography, precipitation with heavy metals or with organic solvents.

Furthermore, in such an instance propagation of cells in the culture broth is not always necessary for the production of these hypoxanthine derivatives. As shown in Example 3, these compounds also may be produced in the cell suspension of the auxotrophs, even under non-proliferative environment.

Thus, the primary object of the invention is industrial production of hypoxanthine derivatives by employing auxotrophs, which require only adenine for growth in the minimum medium. Other objects of the invention and advantages thereof will be readily apparent to those skilled in the art from consideration of the following detailed description.

The invention is illustrated but not limited by the following examples.

*Example 1*

Conidia of a strain, *Bacillus subtilis* A, isolated from the soil were irradiated with X-ray in a dosage which produced about 99% mortality. An auxotroph, A–1–1, requiring adenine for its growth, was obtained by means of irradiation. It was demonstrated that the auxotroph required only adenine, but could not grow by hypoxanthine. This auxotroph was inoculated in a nutrient medium of the following composition:

About:
  Soluble starch _____ 80 g./l.
  Sodium citrate _____ 11.7 g./l.
  $(NH_4)_2HPO_4$ _____ 19.8 g./l.
  KCl _____ 1.49 g./l.
  $MgSO_4 \cdot 7H_2O$ _____ 0.493 g./l.
  $CaCl_2 \cdot 2H_2O$ _____ 0.147 g./l.
  Ethyl alcohol _____ 1% (v.v.).
  Adenine _____ 10 mg./l.
  Soybean extract _____ (50 g. of soybean was extracted with 1 liter of 0.1% NaOH at boiling temperature for 1 hour.)

The inoculated culture medium was shaken on a reciprocal shaker at about 30° C. After about 7 days the cells were removed by centrifuge from the culture broth. From the resulting supernatants, the following amounts of hypoxanthine, inosine, and inosine 5'-monophosphate were recovered.

| Incubation temperature | Period, days | Initial pH | Final pH | Yield (mg./100 ml.) | | |
|---|---|---|---|---|---|---|
| | | | | Hypo-xanthine | Inosine | Inosine 5'-mono-phosphate |
| About: 30° C | 7 | 5.4 | 6.2 | 70 | 100 | 20 |

Example 2

Vegetative cells of a strain, *Sacchromyces cerevisiae* H, isolated from the soil were irradiated with ultraviolet light in a dosage which produced about a 99% mortality. An auxotroph, H-2-12, was obtained by means of irradiation. It was demonstrated that the auxotroph required only adenine, but could not grow by hypoxanthine. This auxotroph was inoculated in a nutrient medium of the following composition:

About:
| | | |
|---|---|---|
| Peptone | g./l | 3.5 |
| Yeast extract | g./l | 1.0 |
| KH$_2$PO$_4$ | g./l | 2.0 |
| MgSO$_4$·7H$_2$O | g./l | 1.0 |
| Pyridoxine | γ/l | 200 |
| Pantothenic acid | γ/l | 200 |
| Thiamine | γ/l | 200 |
| Niacin | γ/l | 200 |
| Biotin | γ/l | 20 |
| Adenine | mg./l | 10 |
| Glucose | mg./l | 40 |

The inoculated culture medium was shaken on a reciprocal shaker at about 25° C. After about 10 days the cells were separated from the culture broth by centrifuge, and extracted with cold 0.5 N perchloric acid. The extracted solution was neutralized with potassium hydroxide and the resulting precipitate of potassium perchlorate was removed. The supernatant was combined with culture liquor. From the combined solution, the following amounts of hypoxanthine, inosine, and inosine 5'-monophosphate were recovered.

| Incubation temperature | Period, days | Initial pH | Final pH | Yield (mg./100 ml.) | | |
|---|---|---|---|---|---|---|
| | | | | Hypo-xanthine | Inosine | Inosine 5'-mono-phosphate |
| About: 25° C | 10 | 5.4 | 6.8 | 40 | 50 | 30 |

Example 3

The auxotroph employed in Example 1 was used in this example. Vegetative cells of *Bacillus subtilis* A-1-1 obtained from an overnight culture in bacterial complete medium were suspended in M/15 phosphate buffer containing following nutrient sources.

About:
| | | |
|---|---|---|
| Glucose | g./l | 5 |
| Caseinlysate | g./l | 1.5 |
| Glycine | g./l | 0.5 |

The concentration of the cell suspension was adjusted on a basis of about 0.5 mg. of dry weight per ml. The cell suspension was shaken on a reciprocal shaker at about 37° C. for about 12 hours. Then the cells were removed. From the resulting supernatant, the following amounts of hypoxanthine, inosine, and inosine 5'-monophosphate were recovered.

| Incubation temperature | Period, hrs. | pH | Yield (mg./100 ml.) | | |
|---|---|---|---|---|---|
| | | | Hypo-xanthine | Inosine | Inosine 5'-mono-phosphate |
| 37° C | 12 | 5.6 | 50 | 15 | 5 |

Example 4

Conidia of a strain, *Bacillus subtilis* B, isolated from the soil were irradiated with ultraviolet light in a dosage which produced about a 99.5% mortality. An auxotroph, B-2-14, was obtained by means of the irradiation. It was demonstrated that the auxotroph required only adenine but could not grow by hypoxanthine. The auxotroph B-2-14 was inoculated in the same medium as described in Example 1. The inoculated culture medium was shaken on a reciprocal shaker at about 30° C. After about 5 days the cells were removed from the culture broth by centrifugation. From the resulting supernatant, the following amounts of hypoxanthine, inosine, and inosine 5-monophosphate were recovered.

| Incubation temperature | Period, days | Initial pH | Final pH | Yield (mg./100 ml.) | | |
|---|---|---|---|---|---|---|
| | | | | Hypo-xanthine | Inosine | Inosine 5'-mono-phosphate |
| About: 30° C | 5 | 5.4 | 5.6 | 90 | 371 | 95 |

Example 5

The auxotroph employed in Example 4 was used in this example. *Bacillus subtilis* B-2-14 was inoculated in a nutrient medium of the following composition:

About:
| | | |
|---|---|---|
| Meat extract | g./l | 10 |
| Glucose | g./l | 50 |
| Peptone | g./l | 10 |
| MgSO$_4$·7H$_2$O | g./l | 1 |
| Yeast extract | g./l | 1 |
| NaCl | g./l | 1 |
| K$_2$HPO$_4$ | g./l | 1 |
| NaH$_2$PO$_4$·2H$_2$O | g./l | 1 |
| Sodium formate | g./l | 2 |

The inoculated culture medium was shaken on a reciprocal shaker at about 30° C. After about 6 days the cells were removed from the culture broth by centrifugation. From the resulting supernatant, the following amounts of hypoxanthine and inosine were recovered.

| Incubation temperature | Period days | Initial pH | Final pH | Yield (mg./100 ml.) | |
|---|---|---|---|---|---|
| | | | | Hypo-xanthine | Inosine |
| About: 30° C | 6 | 5.8 | 8.0 | 166 | 530 |

Example 6

Vegetative cells of a strain, *Escherichia coli* Q, isolated from the soil were irradiated with ultraviolet light in a dosage which produced about a 99.5% mortality. An auxotroph, Q-2-10, was obtained by means of the irradiation. It was demonstrated that the auxotroph required only adenine, but could not grow by hypoxanthine. This auxotroph was inoculated in the same medium as described in Example 5. The inoculated culture medium was shaken on a reciprocal shaker at about 30° C. After about 6 days the cells were removed by centrifuge from the culture broth. From the resulting supernatant, the following amounts of hypoxanthine were recovered.

| Incubation temperature | Period, days | Initial pH | Final pH | Yield of hypo-xanthine (mg./100 ml.) |
|---|---|---|---|---|
| About: 30° C | 6 | 5.8 | 5.0 | 35 |

Example 7

Conidia of a strain, *Bacillus megatherium* D, isolated from the soil were irradiated with γ-ray in a dosage which caused about a 99% mortality. An auxotroph D-3-5 was obtained by means of the irradiation. It was demonstrated that the auxotroph required only adenine, but could not grow by hypoxanthine. This auxotroph was inoculated in the same medium as described in Example 1. The inoculated culture medium was shaken on a reciprocal shaker at about 30° C. After about 6 days the cells were removed from the culture broth by centrifugation. From the resulting supernatant, the following amounts of hypoxanthine, inosine and inosine 5'-monophosphate were recovered.

| Incubation temperature | Period, days | Initial pH | Final pH | Yield (mg./100 ml.) | | |
|---|---|---|---|---|---|---|
| | | | | Hypo-xanthine | Inosine | Inosine 5'-monophosphate |
| About: 30° C | 6 | 5.4 | 5.8 | 44 | 95 | 17 |

*Example 8*

Conidia of a strain, *Bacillus cereus* R, isolated from the soil were treated with nitrogen mustard in a dosage which caused about a 99% mortality. An auxotroph, R-4-7, was obtained by means of the treatment. It was demonstrated that the auxotroph required only adenine, but could not grow by hypoxanthine. This auxotroph was inoculated in the same medium as described in Example 1. The inoculated culture medium was shaken on a reciprocal shaker at about 30° C. After about 5 days the cells were removed by centrifuge from the culture broth. From the resulting supernatant, the following amounts of hypoxanthine, inosine, and inosine 5'-monophosphate were recovered.

| Incubation temperature | Period, days | Initial pH | Final pH | Yield (mg./100 ml.) | | |
|---|---|---|---|---|---|---|
| | | | | Hypo-xanthine | Inosine | Inosine 5'-monophosphate |
| About: 30° C | 5 | 5.4 | 6.0 | 35 | 73 | 12 |

*Example 9*

Vegetative cells of a strain, *Torula utilis* I, isolated from the soil were irradiated with ultraviolet light in a dosage which caused about a 98.5% mortality. An auxotroph, I-2-3, was obtained by means of the irradiation. It was demonstrated that the auxotroph required only adenine, but could not grow by hypoxanthine. This auxotroph was inoculated in the same medium as described in Example 2. The inoculated culture medium was shaken on a reciprocal shaker at about 28° C. After about 7 days the cells were separated from the culture broth by centrifuge, and extracted with hot water. The extracted solution was combined with culture liquor. From the resulting combined solution, the following amounts of hypoxanthine, inosine, and inosine 5'-monophosphate were recovered.

| Incubation temperature | Period, days | Initial pH | Final pH | Yield (mg./100 ml.) | | |
|---|---|---|---|---|---|---|
| | | | | Hypo-xanthine | Inosine | Inosine 5'-monophosphate |
| About: 28° C | 7 | 5.4 | 6.9 | 19 | 27 | 14 |

*Example 10*

Conidia of a strain, *Streptomyces fradiae* D, isolated from the soil were irradiated with ultraviolet light in a dosage which caused about a 99.5% mortality. An auxotroph, D-2-6, was obtained by means of the irradiation. It was demonstrated that the auxotroph required only adenine, but could not grow by hypoxanthine. This auxotroph was inoculated in a nutrient medium of the following composition:

About:
| | | |
|---|---|---|
| $K_2HPO_4$ | g./l | 7.0 |
| $KH_2PO_4$ | g./l | 3.0 |
| Sodium Citrate | g./l | 0.5 |
| $(NH_4)_2SO_4$ | g./l | 1.0 |
| Caseinlysate | g./l | 10.0 |
| Glucose | g./l | 20.0 |
| Pyridoxine | γ/l | 200 |
| Pantothenic acid | γ/l | 200 |
| Thiamine | γ/l | 200 |
| Niacin | γ/l | 200 |
| Inositol | γ/l | 200 |
| Biotin | γ/l | 200 |
| Para-aminobenzoic acid | mg./l | 10 |
| Adenine | mg./l | 10 |

The inoculated culture medium was shaken on a reciprocal shaker at 30° C. After 5 days the cells were removed from the culture broth by centrifugation. From the resulting supernatant, the following amounts of hypoxanthine, inosine, and inosine 5'-monophosphate were recovered.

| Incubation temperature | Period, days | Initial pH | Final pH | Yield (mg./100 ml.) | | |
|---|---|---|---|---|---|---|
| | | | | Hypo-xanthine | Inosine | Inosine 5'-monophosphate |
| About: 30° C | 5 | 6.8 | 7.5 | 97 | 241 | 60 |

*Example 11*

Conidia of a strain, *Pencilillium citrinum* Thom 1131, were irradiated wtih ultraviolet light in a dosage which caused about a 96% mortality. An auxotroph 1131-2-9 was obtained by means of the irradiation. It was proved that the auxotroph required only adenine, but could not grow by hypoxanthine. This auxotroph was incubated on a nutrient medium of the following composition:

About:
| | | |
|---|---|---|
| Glucose | g./l | 50 |
| Peptone | g./l | 5 |
| $K_2HPO_4$ | g./l | 0.5 |
| $KH_2PO_4$ | g./l | 0.5 |
| $CaCl_2 \cdot 2H_2O$ | g./l | 0.4 |
| $MgSO_4 \cdot 7H_2O$ | g./l | 0.4 |
| Yeast extract | g./l | 2 |

The inoculated culture medium was shaken on a reciprocal shaker at about 30° C. After about 5 days the mycelia were separated from the culture broth, ground, and extracted with hot water. The extracted solution was combined with culture liquor. From the resulting combined solution, the following amounts of hypoxanthine, inosine, and inosine 5'-monophosphate were recovered.

| Incubation temperature | Period, days | Initial pH | Final pH | Yield (mg./100 ml.) | | |
|---|---|---|---|---|---|---|
| | | | | Hypo-xanthine | Inosine | Inosine 5'-monophosphate |
| About: 30° C | 5 | 5.6 | 5.2 | 33 | 41 | 18 |

*Example 12*

Conidia of a strain, *Aspergillus oryzae* var. No. 13, were irradiated with ultraviolet light in a dosage which caused about a 98% mortality. An auxotroph 13-2-4 was obtained by means of the irradiation. It was demonstrated that the auxotroph required only adenine, but could not grow by hypoxanthine. This auxotroph was inoculated in a nutrient medium of the following composition:

About:

| | |
|---|---|
| Glucose | g./l. 50 |
| Peptone | g./l. 2 |
| NaNO$_3$ | g./l. 3 |
| K$_2$HPO$_4$ | g./l. 1 |
| KCl | g./l. 0.5 |
| MgSO$_4$·7H$_2$O | g./l. 0.5 |
| FeSO$_4$ | g./l. 0.01 |
| Yeast extract | g./l. 2 |

The inoculated culture medium was shaken on a reciprocal shaker at about 30° C. After about 5 days the mycelia were removed from the culture broth. From the resulting supernatant, the following amounts of hypoxanthine, inosine, and inosine 5′-monophosphate were recovered.

| Incubation temperature | Period, days | Initial pH | Final pH | Yield (mg./100 ml.) | | |
|---|---|---|---|---|---|---|
| | | | | Hypo-xanthine | Inosine | Inosine 5′-mono-phosphate |
| About: 30° C | 5 | 5.6 | 5.4 | 16 | 23 | 9 |

For claim purposes the definition "growing in adenine only" means that the culture does not grow in hypoxanthine.

After reading the foregoing detailed description of the preferred and illustrative various examples of the invention, it will be understood that the objects set forth at the outset of this specification have been successfully achieved.

What we claim is:

1. A process for preparing at least one compound selected from a first group consisting of hypoxanthine, inosine, and inosine 5′-monophosphate, comprising the steps of cultivating an auxotroph selected from a second group, consisting of auxotrophs of *Bacillus subtilis* which are capable of growing in adenine only, otherwise selected independently of the classificational positions of their parental strains, of treating said auxotroph of said second group by a source selected from the group consisting of X-rays, ultraviolet rays, γ-rays and nitrogen mustard, of exposing said auxotroph selected from said second group to a nutrient medium having greater amounts of nutrient sources than required solely for propagation of cells and of extracting from the resulting culture liquor at least one compound selected from said first group.

2. A process for preparing at least one compound as claimed in claim 1, wherein the compound selected from said second group is *Bacillus subtilis* A, said source of treating is irradiation by X-rays in a dosage causing about a 99% mortality and resulting in an auxotroph, A–1–1, growing in adenine only, said step of exposing said auxotroph to said nutrient sources occurring for about seven days at about 30° C. by shaking therewith.

3. A process for preparing at least one compound as claimed in claim 1 wherein the compound selected from said second group is *Bacillus subtilis* B, producing auxotroph B–2–14, said step of exposing said auxotroph to said nutrient source occurring for about five days at about 30° C.

4. A process for preparing at least one compound as claimed in claim 1, wherein the compound selected from said second group is *Bacillus megatherium* D, said source of irradiation treatment is irradiation by γ-rays in a dosage causing about a 99% mortality and resulting in an auxotroph D–3–5, growing in adenine only.

5. A process for preparing at least one compound selected from a first group consisting of hypoxanthine, inosine, and inosine 5′-monophosphate, comprising the steps of cultivating vegetative cells of *Bacillus subtilis* A–1–1 in cell suspension in M/15 phosphate buffer including about: glucose 5 g./l., caseinlysate 1.5 g./l., glycine 0.5 g./l., the concentration of the cell suspension being adjusted on a basis of about 0.5 mg. of dry weight per ml., and of extracting from the resulting culture at least one compound selected from said first group.

6. A process for preparing at least one compound selected from a first group consisting of hypoxanthine, inosine, and inosine 5′-monophosphate, comprising the steps of cultivating an auxotroph selected from a second group of *Bacillus subtilis* B–2–14, capable of growing in adeninen only, otherwise selected independently of the classificational position of their parental strain of exposing said autotroph selected from said second group to a nutrient medium having about: meat extract 10 g./l., glucose 50 g./l., peptone 10 g./l., MgSO$_4$·7H$_2$O 1 g./l., yeast extract 1 g./l., NaCl 1 g./l., K$_2$HPO$_4$ 1 g./l., NaH$_2$PO$_4$·2H$_2$O 1 g./l., sodium formate 2 g./l., said step of exposing said autotroph to said nutrient medium occurring for about six days at about 30° C. and of extracting from the resulting culture liquor at least one compound selected from said first group.

7. A process for preparing at least one compound selected from a first group consisting of hypoxanthine, inosine, and inosine 5′-monophosphate, comprising the steps of cultivating an auxotroph selected from a second group consisting of auxotrophs of *Bacillus cereus* R, capable of growing in adenine only, otherwise selected independently of the classificational positions of their parental strains, of treating the Bacillus auxotroph with nitrogen mustard in a dosage causing about 99% mortality, obtaining therefrom an auxotroph, R–4–7, of exposing said auxotroph selected from said second group to a nutrient medium, comprising about: soluble starch 80 g./l., sodium citrate 11.7 g./l., (NH$_4$)$_2$HPO$_4$ 19.8 g./l., KCl 1.49 g./l., MgSO$_4$·7H$_2$O 0.493 g./l., CaCl$_2$·2H$_2$O 0.147 g./l., ethyl alcohol 1% (v./v.), adenine 10 mg./l., soybean extract (50 g. of soybean was extracted with 1 liter of 0.1% NaOH at boiling temperature for 1 hour) for about five days at about 30° C. of extracting from the resulting culture liquor at least one compound selected from said first group.

8. A process for preparing at least one compound selected from a first group consisting of hypoxanthine, inosine, and inosine 5′-monophosphate, comprising the steps of cultivating an auxotroph selected from a second group consisting of auxotrophs of *Sacchromyces cerevisiae* H, capable of growing in adenine only, otherwise selected independently of the classificational position of their parental strain, of treating said auxotroph by ultraviolet light in a dosage which produces a 99% mortality and resulting in an auxotroph, H–2–12, growing in adenine only, of exposing said auxotroph selected from said second group to a nutrient source comprising about: peptone 3.5 g./l., yeast extract 1.0 g./l., KH$_2$PO$_4$ 2.0 g./l., MgSO$_4$·7H$_2$O 1.0 g./l., pyridoxine 200 γ/l., pantothenic acid 200 γ/l., thiamine 200 γ/l., niacin 200 γ/l., biotin 20 γ/l., adenine 10 mg./l., glucose 40 mg./l., for about ten days at about 25° C., and of extracting from the resulting culture liquor at least about one compound selected from said first group.

9. A process for preparing at least one compound selected from a first group consisting of hypoxanthine, inosine, and inosine 5′-monophosphate, comprising the steps of cultivating an auxotroph selected from a second group, consisting of auxotrophs of *Escherichia coli* Q, in vegetative cells, capable of growing in adenine only, otherwise selected independently of the classificational positions of their parental strains, of treating said auxotroph by a source selected from the group consisting of X-rays, ultraviolet rays, γ-rays and nitrogen mustard, of exposing the resulting auxotroph Q–2–10 to a nutrient medium having greater amounts of nutrient sources than required solely for propagation of cells and of extracting from the resulting culture liquor at least one compound selected from said first group.

10. A process for preparing at least one compound selected from a first group consisting of hypoxanthine, inosine, and inosine 5'-monophosphate, comprising the steps of cultivating an auxotroph selected from a second group consisting of auxotrophs of *Torula utilis* I, capable of growing in adenine only, otherwise selected independently of the classificational position of their parental strain, of treating said auxotroph by ultraviolet light in a dosage causing about 98.5% mortality and resulting in an auxotroph, I-2-3, growing in adenine only, of exposing the resulting auxotroph to a nutrient medium having greater amounts of nutrient sources than required solely for propagation of cells and of extracting from the resulting culture liquor at least one compound selected from said first group.

11. A process for preparing at least one compound selected from a first group consisting of hypoxanthine, inosine, and inosine 5'-monophosphate, comprising the steps of cultivating an auxotroph selected from a second group consisting of auxotrophs *Streptomyces fradiae* D, capable of growing in adenine only, otherwise selected independently of the classificational position of their parental strain of treating said auxotroph by ultraviolet rays, of exposing the resulting auxotroph, D-2-6, to a nutrient medium having greater amounts of nutrient sources than required solely for propagation of cells and of extracting from the resulting culture liquor at least one compound selected from said first group.

12. A process for preparing at least one compound selected from a first group consisting of hypoxanthine, inosine, and inosine 5'-monophosphate, comprising the steps of cultivating an auxotroph selected from a second group, consisting of auxotrophs of *Penicillium citrinum* Thom 1131, which are capable of growing in adenine only, otherwise selected independently of the classificational positions of their parental strains, of treating said auxotroph of said second group by ultraviolet rays, of exposing said auxotroph selected from said second group to a nutrient medium having greater amounts of nutrient sources than required solely for propagation of cells and of extracting from the resulting culture liquor at least one compound selected from said first group.

13. A process for preparing at least one compound selected from a first group consisting of hypoxanthine, inosine, and inosine 5'-monophosphate, comprising the steps of cultivating an auxotroph selected from a second group consisting of auxotrophs of *Aspergillus oryzae* var. No. 13, capable of growing in adenine only, otherwise selected independently of the classificational position of their parental strain, of treating said auxotroph by ultraviolet rays, of exposing said auxotroph selected from said second group to a nutrient medium having greater amounts of nutrient sources than required solely for propagation of cells and of extracting from the resulting culture liquor at least one compound selected from said first group.

References Cited in the file of this patent

Cook: The Chemistry and Biology of Yeasts, Academic Press Inc., New York, 1958, page 493. (Copy in Div. 63.)